United States Patent [19]

Vickers et al.

[11] 4,349,114
[45] Sep. 14, 1982

[54] STORAGE RACK

[75] Inventors: Derek Vickers, Carlingford; John C. Waterhouse, Allambie Heights, both of Australia

[73] Assignee: Fenamec (Australia) Pty. Ltd., Australia

[21] Appl. No.: 155,151

[22] Filed: May 30, 1980

[30] Foreign Application Priority Data

Jun. 11, 1979 [AU] Australia .............................. PD9135

[51] Int. Cl.$^3$ ............................................. B65G 13/00
[52] U.S. Cl. .................................. 211/151; 193/35 R; 211/49 D
[58] Field of Search ............................ 211/151, 49 D; 193/35 R, 37

[56] References Cited

U.S. PATENT DOCUMENTS

| 2,990,929 | 7/1961 | Attwood | 193/35 R |
| 3,744,610 | 7/1973 | Tabler | 193/35 R |
| 4,168,780 | 9/1979 | Parrott | 211/151 |

FOREIGN PATENT DOCUMENTS

| 2366190 | 9/1976 | France | 193/35 R |
| 199293 | 10/1965 | Sweden | 193/35 R |
| 2029354 | 3/1980 | United Kingdom | 193/35 R |

Primary Examiner—Ernest R. Purser
Attorney, Agent, or Firm—Morgan, Finnegan, Pine, Foley & Lee

[57] ABSTRACT

A storage rack including generally horizontal load receiving beams and a plurality of wheel assemblies attached to the beams adapted to support items to be stored on the rack, the wheel assemblies having a body portion which frictionally engages one of the beams and an axle portion rotatably supporting at least one wheel.

4 Claims, 7 Drawing Figures

STORAGE RACK

The present invention relates to storage racks and more particularly but not exclusively to "live" storage racks.

Live storage describes a condition whereby items such as boxes, containers or pallets are stored in a form of shelving or racking normally at rest but "live" in the sense that when one item is taken away, it is automatically replaced by another one. In one form, as in illustration, instead of the shelving being horizontal and static, it may be inclined to such an angle that the items tend to slide to the lower end. Such means enable items to be loaded into one side of the shelving and taken out the other, but most importantly, the items move from the input side to the output side by themselves whenever space is available. Thus storage accommodation available may be indefinitely increased while limiting the space occupied by the end items to only one. It may be seen that where many different items are stored in such a storage medium, the actual space in each of the input and output sides occupied by an item by each variety may be limited to one while the extra volume of the variety is contained in the body of the shelf or rack. By so doing, the distance to be traversed by the loading and unloading operators along the input and output sides is substantially reduced.

The principle described above is a well established means of storing in the materials handling field. Although, simple, the form of tilted slides, described above, suffers from the disadvantage of the large relative distance between the input and output heights if the lengths of the slides are required to be large. Accordingly, established variations replace the flat surface of the slides by runners of low friction material, or more particularly, by rows of wheels.

However to-date known racks including wheeled arrangements have several disadvantages in that they are expensive to manufacture and are often restricted in their use as the number of wheels per length of rack is predetermined and is often not variable.

It is the object of the present invention to overcome or substantially ameliorate the above disadvantages.

There is disclosed herein a storage rack having at least one generally horizontal load supporting beam, a plurality of wheel assemblies attached to the beam at longitudinally spaced locations, each wheel assembly including an axle body with a slot within which a portion of said beam extends, and at least one wheel rotatably supported by the axle body.

There is further described herein a wheel and axle assembly for attachment to a longitudinal member of a storage rack, said axle having a body portion and a shaft portion, said wheel being rotatably supported by said shaft portion, and wherein said body portion has a cavity to receive said longitudinal member to secure the assembly to said member.

A preferred form of the present invention will now be described by way of example with reference to the accompanying drawings in which:

FIG. 1 schematically depicts a "live" storage rack;

FIG. 2 schematically depicts a wheel arrangement for the rack of FIG. 1;

Figure 1:
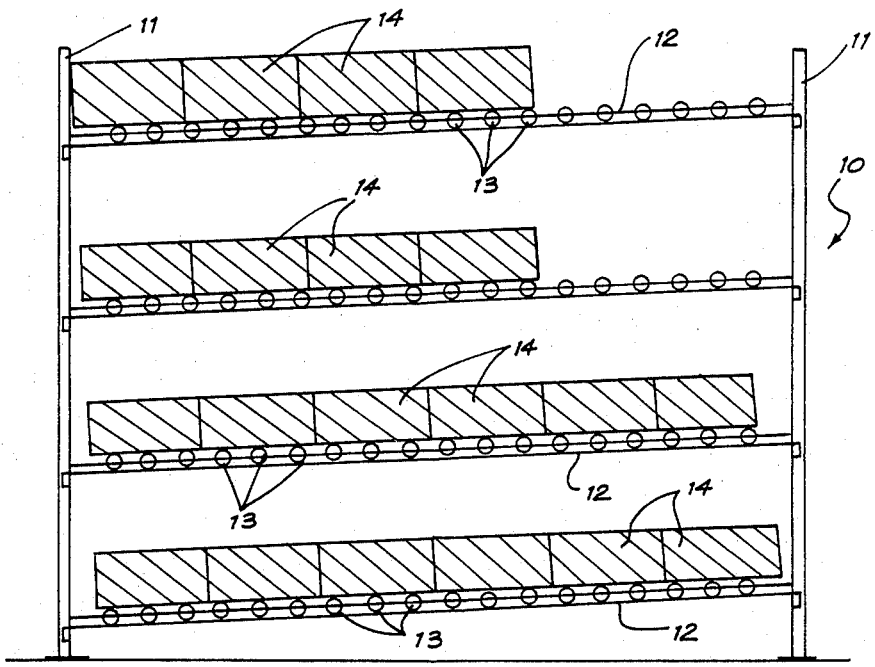

The rack 10 of FIG. 1 comprises vertical members 11 joined by a plurality of longitudinal members 12 to which are attached a plurality of wheels 13 to support the products 14 which in this particular embodiment are biased towards left hand end of the rack 10 under the influence of gravity. This is achieved by the longitudinal members 12 sloping downwardly from right to left.

Figure 2:
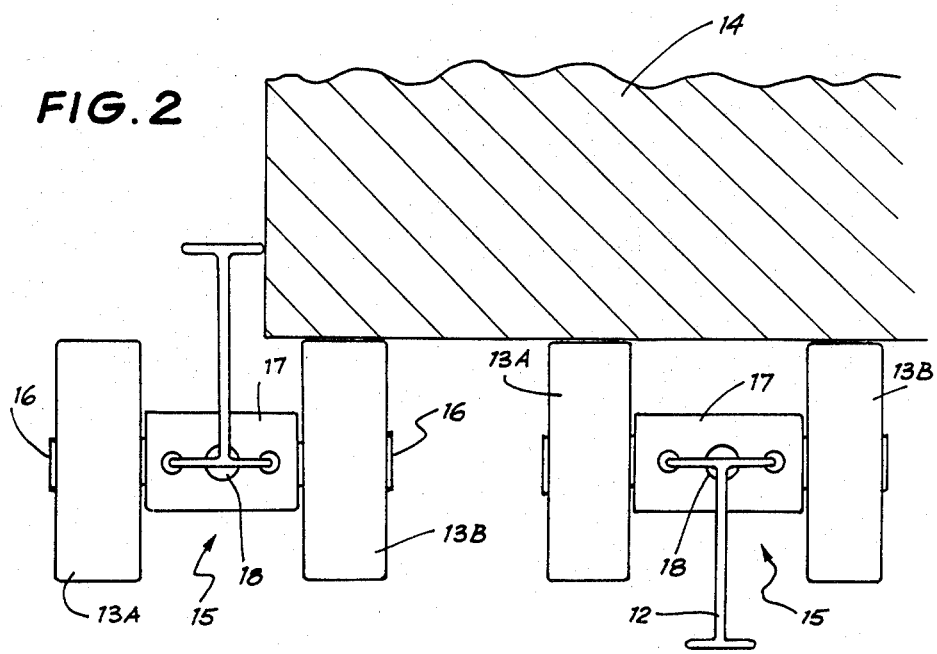

Now with reference to FIG. 2 there is depicted a wheel arrangement including pairs of wheels 13A and 13B while the longitudinal members 12 are of an "I" shaped transverse cross-section. The pairs of wheels 13A and 13B are supported by axle means 15 which include stub axles 16 rotatably supporting the pairs of wheels 13A and 13B. The axle means 15 further includes a body portion 17 from which extends the stub axles 16, which body portion 17 includes a cavity 18 adapted to receive the lower flange of the "I" section of the longitudinal members 12. It should be appreciated that the cavity 18 is transversely extending so as the upper portions of the member 17 are deflectable away from the lower portions thereof to thereby resiliently clamp the axle means 15 to the lower flange of the longitudinal member 12. Thus the axle means 15 are held in position by frictionally engaging the longitudinal members 12. As also can be seen from FIG. 2 the longitudinal member 12 can be adapted to extend downwardly away from the product or upwardly towards the product so as to provide, as in the left hand illustration of the wheel means 15, a divider to divide transversely adjacent products. In both cases the longitudinal members 12 whether they project upwardly or downwardly provide the support for the wheels 13A and 13B.

Figure 3:
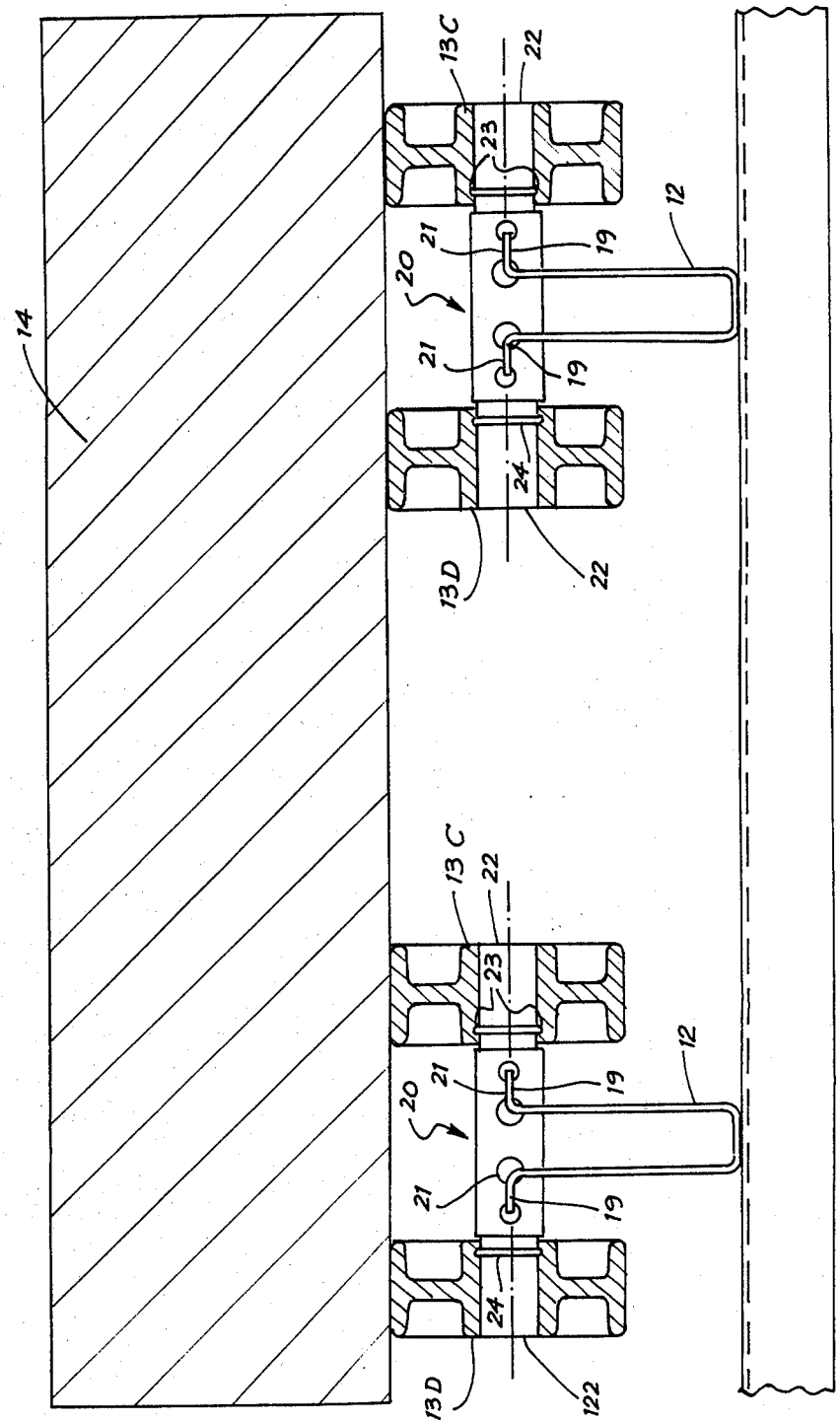
FIG. 3 depicts an alternative wheel arrangement to that of FIG. 2 for use with the storage rack of FIG. 1.

In FIG. 3 an alternative means of mounting the wheels 13 is illustrated. In this particular embodiment the longitudinal members are U-shaped members having upper flanges 19 to frictionally engage the axle means 20 by being received within cavities 21 of the wheel means 20. In a similar manner to the embodiment of FIG. 2 the lower portions of the axle means 20 are resiliently deflectable away from the upper portions so as to frictionally engage the flanges 19 of the longitudinal members 12 thereby providing means to secure the axle means 20 to the longitudinal members 20. The axle means 20 include stub axles 22 about which the wheels 13C and 13D rotate. To ensure that the wheels 13C and 13D are retained on the stub axles 22 there is provided in each of the wheels 13C and 13D an annular recess 23 within which there is received by snap engagement an annular projection 24.

Figure 4:
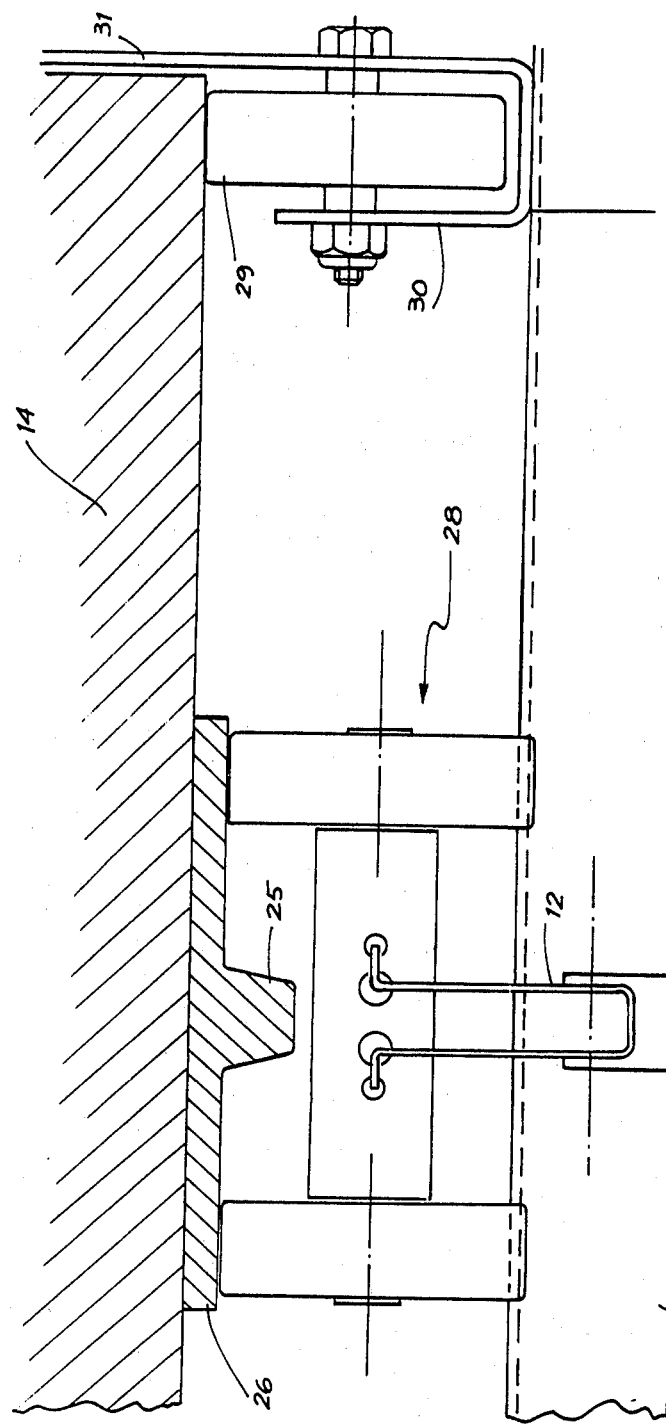
FIG. 4 is a powered alternative to the wheel arrangement of FIG. 3.
Figure 5:
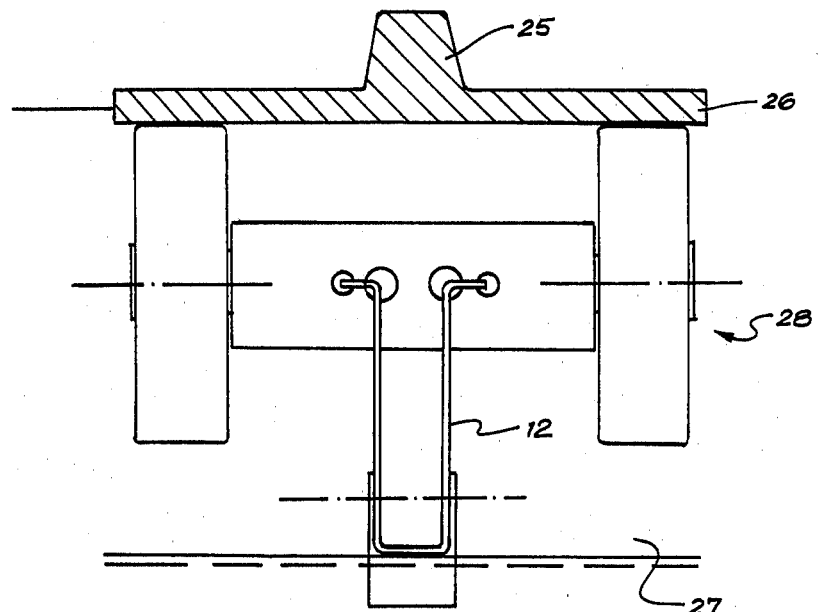
FIG. 5 is the belt return mechanism for the wheel arrangement of FIG. 4.

In FIG. 4 there is depicted a powered version of the embodiment of FIG. 3 wherein the product 14 is moved by means of a power driven belt 26 which has a plurality of teeth 25 to be received within a driving sprocket not illustrated. The U-shaped longitudinal members 12 are supported by transverse support members 27 not illustrated in the rack of FIG. 1. The wheel arrangement of this present embodiment is particularly adapted to convey heavy products as the wheeled arrangement 28 supports little of the load but provide the means for transporting the product 14. On the other hand the majority of the weight of the product 14 is supported by end wheels 29 which are located in longitudinal members 30. The members 30 extend upwardly so as to provide a divider 31 between the transversely adjacent products. In FIG. 5 there is illustrated a return for the belt 26 again by means of the wheeled arrangement 28 located on a lower transverse support member 27.

Figure 6:
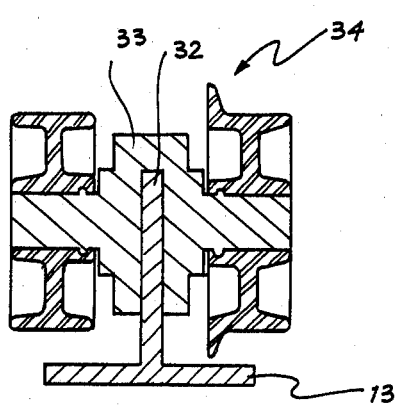
FIG. 6 is a further alternative for the wheel and axle arrangement to be used in the rack of FIG. 1.
Figure 7:
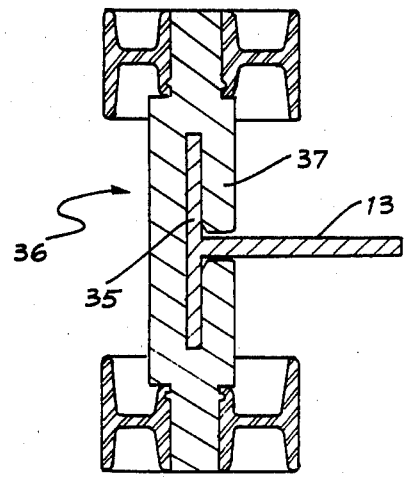
FIG. 7 is still a further variation of the wheel and axle arrangement to that of FIG. 6.

In FIG. 6 there is illustrated a longitudinal member 13 of T-shaped cross section having its vertical flange 32 located within the axle means 33 which is resiliently biased to engage the flange 32 to secure the wheel arrangement 34 to the longitudinal member 13. In FIG. 7 the longitudinal member 13 is again of T-shaped cross section having its end flange 35 frictionally engaged within the axle means 36 as the portions 37 are deflectable outwardly so as to resiliently engage the flange 35 to secure the axle means 36 to the longitudinal member 13 by friction.

It should be appreciated that since the axle means are only held in position by friction the spaces between the pair of wheels is easily adjusted to particular requirements.

Still further to this it should be appreciated that the axis of the axles may be normal to the axis of the longitudinal members or parallel thereto.

What we claim is:

1. A storage rack having at least one generally horizontally load supporting beam, said beam having at least one longitudinally extending web from which projects in a transverse direction a longitudinally extending flange, a plurality of wheel assemblies attached to the beam at longitudinally spaced locations, each wheel assembly including an axle body with a slot within which a portion of said flange and web are located thereby fixing the axle body to the beam, at least one wheel rotatably supported by the axle body, and wherein each axle body is frictionally restrained from longitudinal movement by the axle body being resiliently biased to engage said flange and said axler body is fixed against transverse movement by the web.

2. The rack of claim 1 wherein said beam is of "T-shaped" transverse cross-section, and said slot is of a complementary cross-section to that of said beam.

3. The storage rack of claim 1 wherein said beam is of a generally "U-shaped" transverse cross-section, and said body has two of the slots which engage the longitudinal edge portions of the beam.

4. The storage rack of claim 3 wherein said axle body has two steel axles extending generally normal to said web, each rotatably supporting a wheel.

* * * * *